(12) United States Patent  (10) Patent No.: US 7,900,511 B2
Silvano et al.  (45) Date of Patent: Mar. 8, 2011

(54) DEVICE FOR LOCKING-UNLOCKING TIRED WHEELS OF VEHICLES ON A MANDREL OF A MAINTENANCE MACHINE

(75) Inventors: Santi Silvano, Imola (IT); Manganelli Fausto, Casalecchio Di Reno (IT)

(73) Assignee: Ravaglioli S.p.A., Bologna (IT)

( * ) Notice: Subject to any disclaimer, the term of this patent is extended or adjusted under 35 U.S.C. 154(b) by 1076 days.

(21) Appl. No.: 11/655,184

(22) Filed: Jan. 19, 2007

(65) Prior Publication Data
US 2007/0180906 A1 Aug. 9, 2007

(30) Foreign Application Priority Data
Jan. 19, 2006 (IT) .............................. VR2006A0013

(51) Int. Cl.
*G01M 1/00* (2006.01)
(52) U.S. Cl. .......................................................... 73/487
(58) Field of Classification Search .................. 73/487, 73/66, 460
See application file for complete search history.

(56) References Cited
U.S. PATENT DOCUMENTS
| 5,777,224 A | 7/1998 | Coetsier et al. | |
| 6,074,118 A * | 6/2000 | Ferrari et al. | 403/31 |
| 6,668,859 B1 | 12/2003 | Wu | |
| 6,763,715 B2 * | 7/2004 | Corghi | 73/487 |
| 2004/0065150 A1 | 4/2004 | Corghi | |

FOREIGN PATENT DOCUMENTS
DE 4200365 A1 7/1993
* cited by examiner

*Primary Examiner* — Hezron Williams
*Assistant Examiner* — Nathaniel Kolb
(74) *Attorney, Agent, or Firm* — Orum & Roth LLC

(57) ABSTRACT

A locking device for a maintenance machine such as a balancing machine, of a rotating body (5), having a fixed portion comprising a hollow fixed support element (2) borne by the maintenance machine, and a control system (59), and a movable portion comprising a bell-shaped member (12) with flange (13) mounted for rotation coaxial to said hollow support element (2) and designed to support the rotating body (5), and holding or locking means (68) arranged to removably fix the rotating body (5) against said flange (13) of the bell-shaped member (12), driving means suitable for driving, upon control, said movable portion in rotation. The movable portion comprises a sleeve element (9), which is operatively connected with the driving means, mounted for rotation on said fixed support element (2) and has one of its ends extending overhanging beyond said fixed support (2) and coaxially supporting at its head the bell-shaped member (12), thereby delimiting a work chamber (17) with said bell-shaped member (12); a piston element (19) slidably mounted in the work chamber (17) and designed to control said holding means. The fixed portion comprises pressurized fluid supply means (34, 32, 48) suitable for loading, upon control of the control system (59), the work chamber (17) with pressurized fluid, and for moving away from the movable portion before the movable portion is set in rotation by the driving means, and discharge means for discharging, upon control, the work chamber (17) once the rotation of the movable part has terminated.

11 Claims, 6 Drawing Sheets

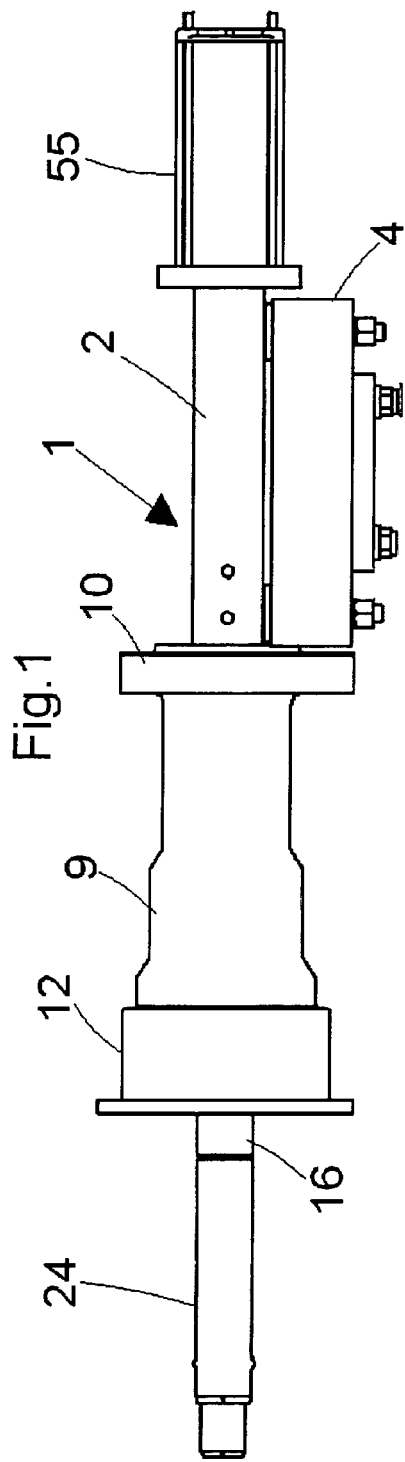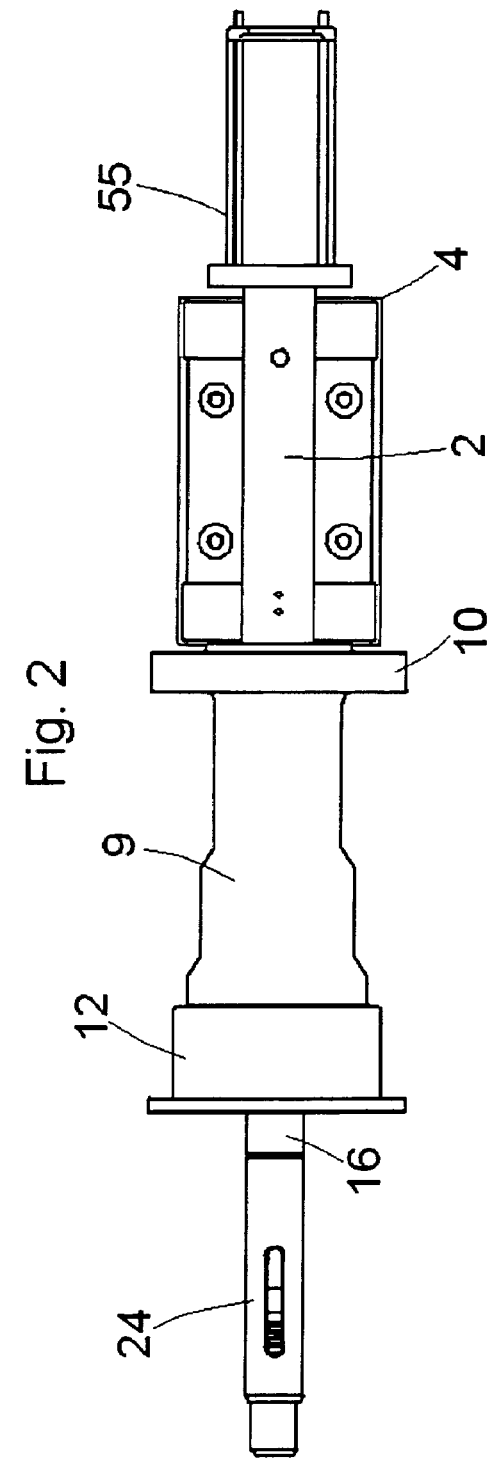

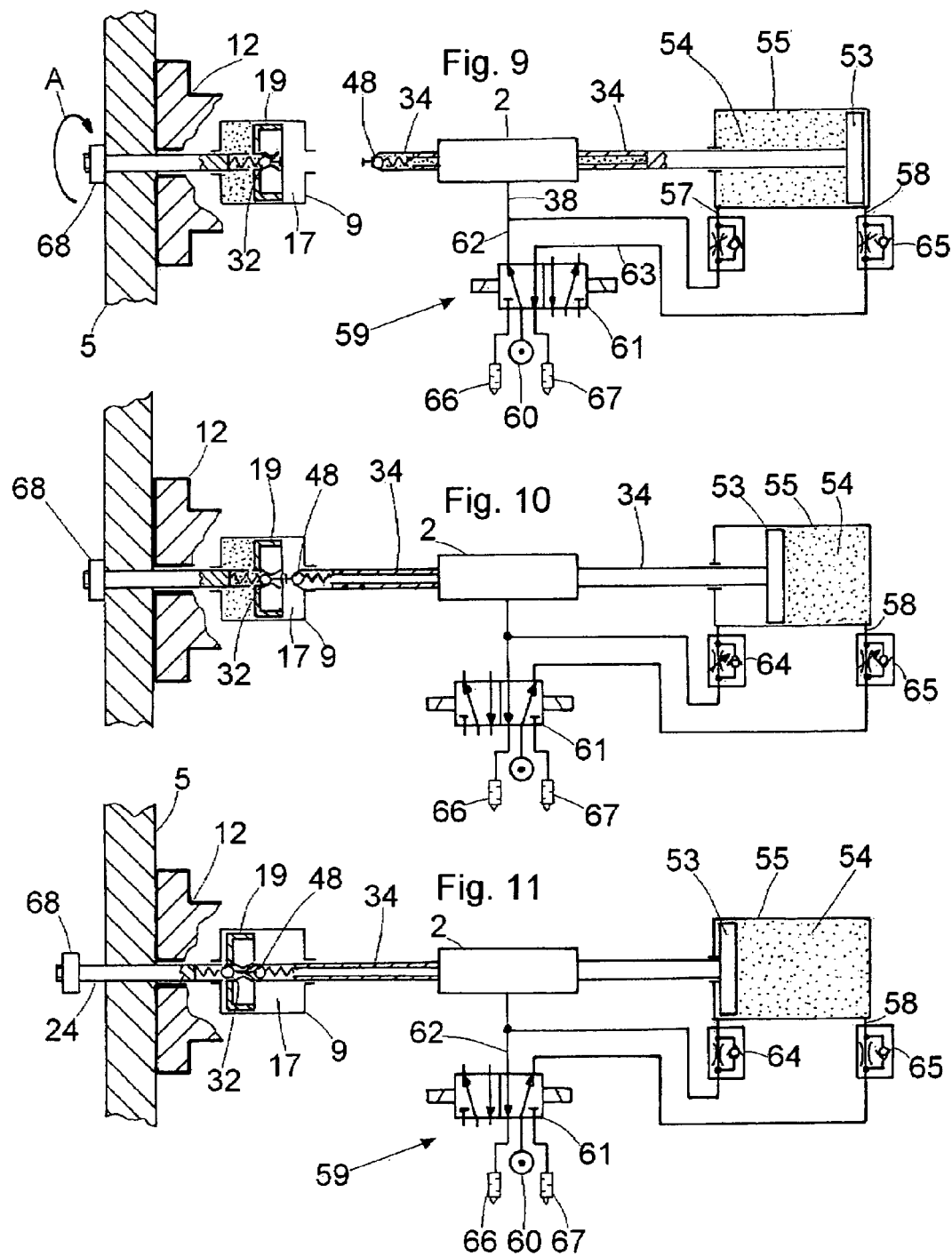

DEVICE FOR LOCKING-UNLOCKING TIRED WHEELS OF VEHICLES ON A MANDREL OF A MAINTENANCE MACHINE

FIELD OF INVENTION

The present invention regards a device for locking-unlocking a body rotating on a rotating mandrel of an operating machine, particularly adapted for locking-unlocking tired wheels of vehicles on the rotating mandrel of a tired wheel maintenance machine, such as a balancing machine or a tire assembly-disassembly machine.

BACKGROUND OF INVENTION

Devices have already been proposed in the art—e. g. U.S. Pat. No. 6,763,715—including locking-unlocking devices on a rotating mandrel of balancing machines, which foresee the use of a screw pressure ring nut which is inserted on the mandrel and unscrewed and removed from it for every wheel to be balanced, as well traction springs with short work stroke. This is a damaging need for the functionality of the balancing machine. Moreover, both the pressure ring nut and the springs must be driven into rotation with the mandrel, which is a source of balancing inaccuracies due to imbalances created during the rotation by the springs, which are subjected to oscillations during their rotation. If one must work with wheels structured in a special manner, it is necessary to support them for their correct locking on the mandrel, which is tiring for the operator.

SUMMARY OF THE INVENTION

The main object of the present invention is that of providing a device for locking-unlocking a tired wheel of a vehicle on a rotating mandrel, where any driving connection between actual locking-unlocking device and mandrel intended to rotate is absent.

Another object of the present invention is that of making available a locking-unlocking device substantially free of rotating floating masses.

Another object of the present invention is that of providing a compact locking-unlocking device of limited size and which can be produced at highly competitive manufacturing costs.

According to a first aspect of the present invention, a locking device is provided for a maintenance machine of a rotating body, having a hollow fixed support element borne by the maintenance machine, a bell-shaped flanged member mounted for rotation coaxially to said hollow support element and designed to support said rotating body, holding means suitable for removably fixing said rotating body against said flange of said bell-shaped member, driving means suitable for driving said bell-shaped member into rotation upon control, and a control system, characterized in that it comprises a sleeve element operatively connected with said driving means and mounted for rotation on said fixed support element, and having one end thereof extending overhanging beyond said fixed support and coaxially supporting the bell-shaped member at the head thereof, thereby delimiting a work chamber with the bell-shaped member; a piston element mounted slidably mounted in said work chamber; an axial piston rod member slidably mounted in an axial shank portion of said bell-shaped member and having an inner end thereof fixed to said piston element and its other end overhangingly extending in axial alignment with said bell-shaped member; valve means borne by said piston element and arranged to control at least one fluid passage therethrough; a rigid tubular element slidably mounted in said hollow fixed support element and having one end in fluid communication with said work chamber and designed to control said valve means of said piston element, and its other end blind, thereby delimiting an inner opening in fluid communication with said control system; and linear actuator means arranged to make said tubular element axially slide in said hollow support element upon control of said control system.

BRIEF DESCRIPTION OF THE DRAWINGS

Further aspects and advantages of the present invention will also appear from the following detailed description of some currently preferred embodiments thereof, given only as exemplifying and non-limiting examples with reference to the accompanying set of drawings, in which:

FIG. 1 is a diagrammatic side view of a mandrel of a balancer for vehicle wheels equipped with a locking-unlocking device according to the present invention;

FIG. 2 is a bottom view of the mandrel FIG. 1;

DESCRIPTION OF THE PREFERRED EMBODIMENTS

Figure 3:
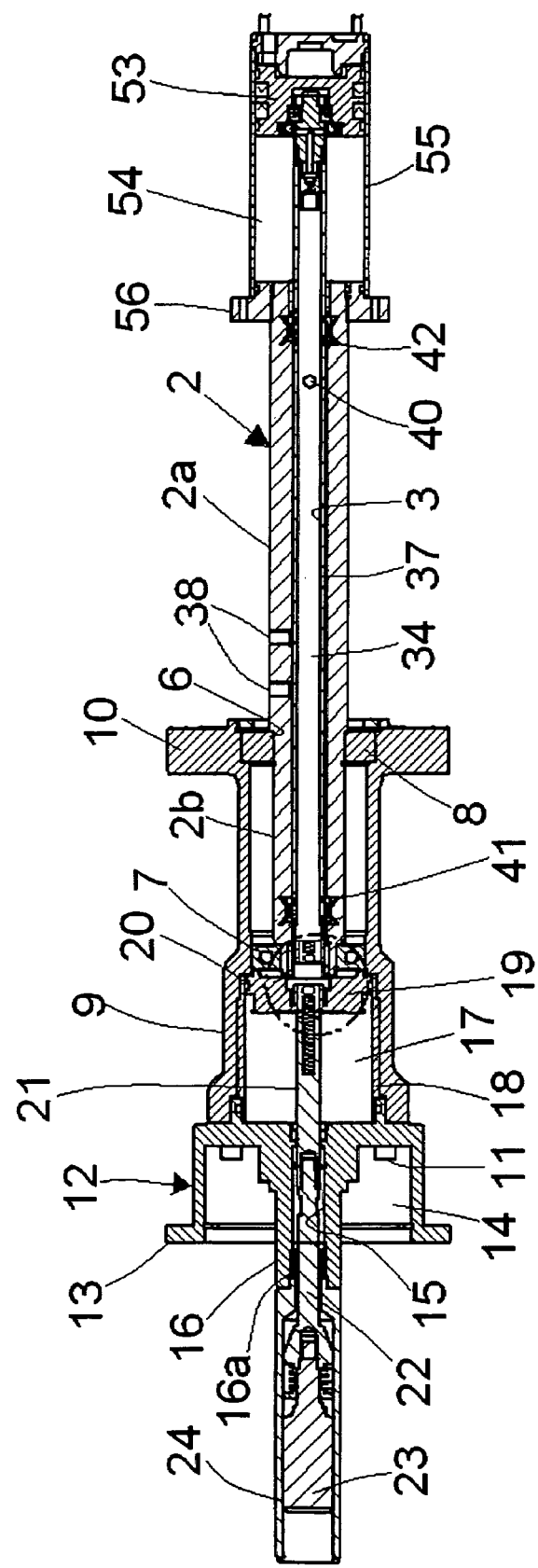
FIG. 3 shows an axial longitudinal section view of the mandrel of FIG. 1.

In the drawings, equivalent or similar parts or components were indicated with the same reference numerals.

With reference first to the above-listed figures, it will be noted how a locking-unlocking device, generically indicated with 1, according to the present invention is composed of a hollow fixed support element or cylindrical shaft 2 having an inner axial cavity 3 and designed to be supported by a fixed structure 4 of a maintenance machine of tired wheels, typically a balancing machine (not shown in the drawings) of any suitable type. A tired wheel is schematically illustrated by a central section 5 of its rim in FIGS. 7 to 11.

The cylindrical shaft 2 has two outer diameters: a greater 2a and a smaller 2b, and thus in an intermediate zone thereof a peripheral shoulder 6 is delimited. At one end of the shaft 2, i.e. that with smaller outer diameter, an outer receiving seat is formed for one or more bearings 7. On the smaller external diameter portion 2b, a bearing 8 is inserted designed to abut against the shoulder 6, as well as a sleeve 9, which is supported overhangingly projecting from the shaft 2 and rotating with respect thereto, since at one end thereof equipped with flange 10 it is supported on the bearing 8, while at an internal intermediate portion thereof it is borne by the bearing or bearings 7. Preferably, at the flanged end 10, the sleeve 9 is operatively connectable, e. g. by means of a motion transmission belt to driving or motion source means, such as an electric motor of any suitable type (not shown in the drawings).

At the head of its overhanging section, the sleeve 9 supports, coaxially fixed to it, e. g. by means of bolts 11, a bell-shaped member 12, which has an abutment end flange 13 for a tired wheel rim 5 to be balanced and internally delimits a peripheral annular chamber 14, on whose bottom the fixing bolts 11 are screwed, and an axial through opening 15 within a shank portion 16, it too axial. The sleeve 9 and bell-shaped member 12 together constitute a rotatable hollow mandrel, typically for a balancing machine.

Between the sleeve 9 and the bell-shaped member 12, a work chamber 17 is delimited, preferably equipped with lining jacket 18, within which a piston element 19 is arranged sliding, preferably equipped with sliding peripheral seal 20 to ensure the seal with the inner wall of the chamber 17 or its lining 18. The piston 19 is equipped with an axial piston rod member 21 which extends in the axial through opening 15 of the bell-shaped member 12.

If desired, the piston rod 21 is constructively supported on a sliding support means, such as a bush 16a, placed in the through opening 15 and is connected, for example screwed, to an extension rod 22 in turn rigidly connected or integral with a slide guide element 23 slidable within a containment cylinder 24 connected, e. g. screwed, to the hollow shank 16, to form an extension at the hub of the shank 16 of the bell-shaped member 12. With this structure, the piston rod 21 is guided without clearances both at the extension rod 22 and the cylinder 24.

Figure 5:
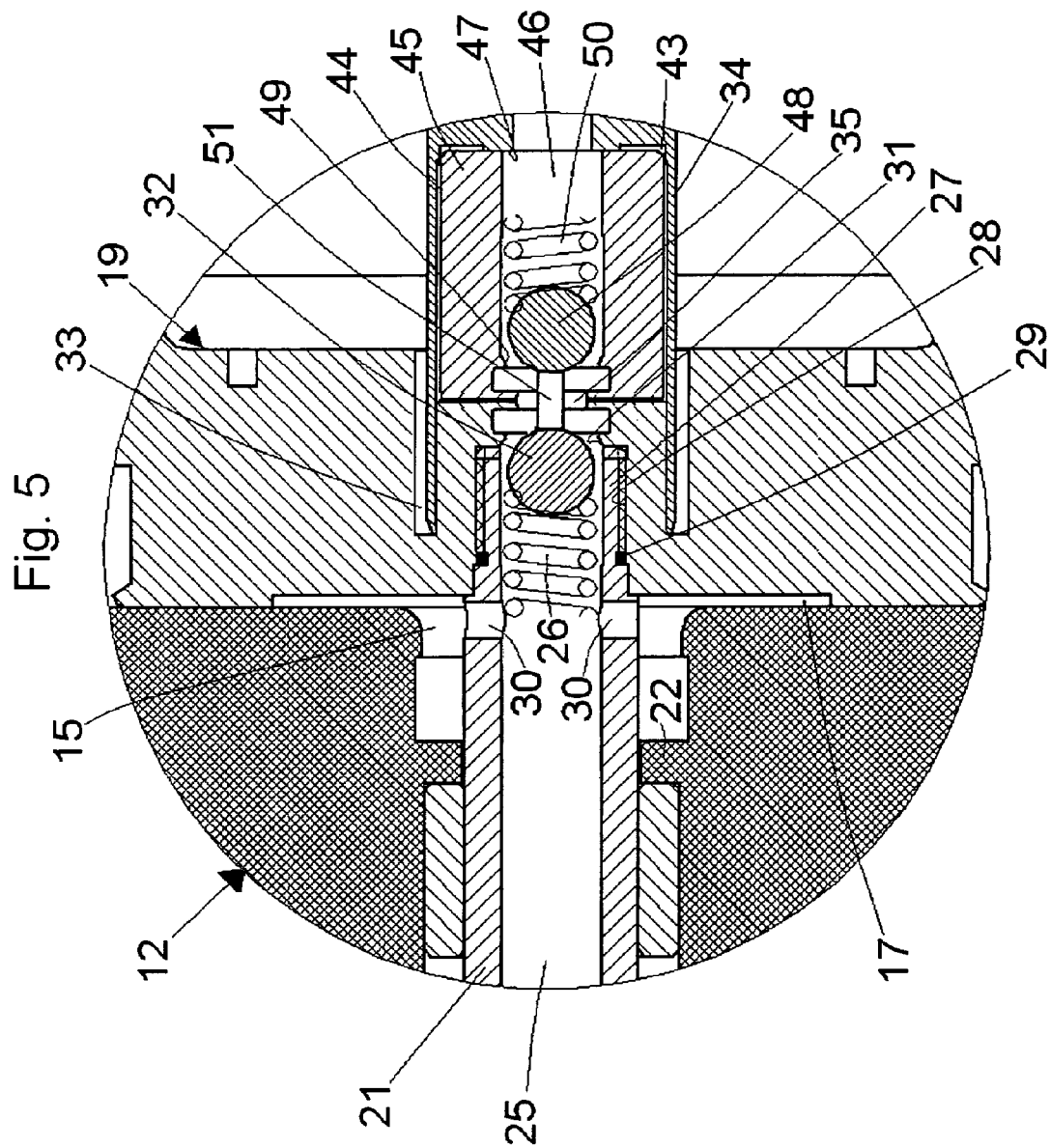

The piston rod 21, at its piston 19 attachment end, has a blind terminal axial cavity 25 in which a resilient loading means is housed, e. g. a calibrated helical spring 26. More particularly, the piston rod 21 has its externally threaded end 27, which can be screwed into an internally-threaded axial receiving seat 28 with the interposition of a seal 29. Very close to the piston 19, but located outside it, the piston rod 21 at the cavity or light 25 has one or a number of lateral passages or ports 30 which place the cavity 25 in fluid communication with the chamber 17 (FIG. 5).

Figure 4:
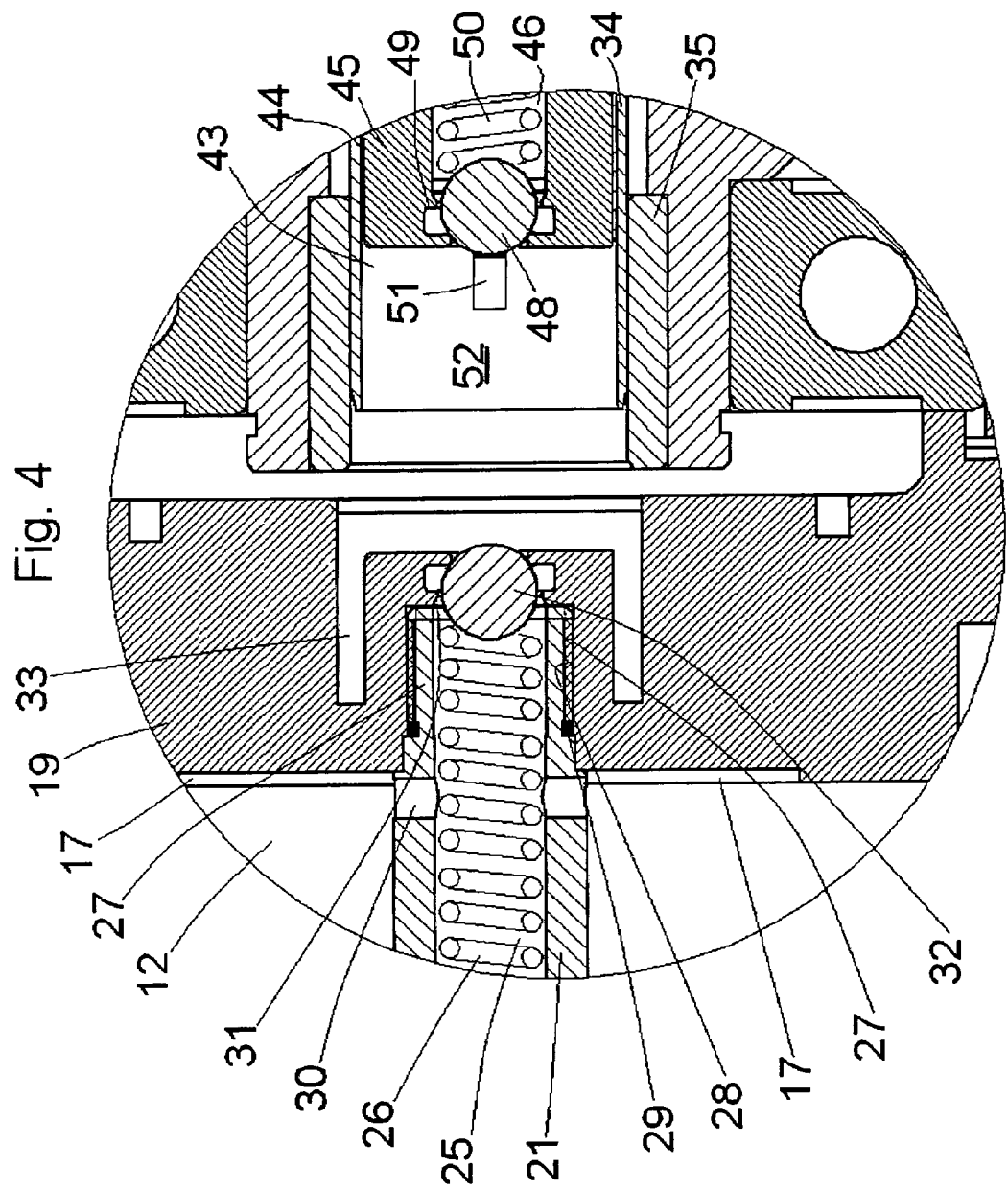
FIGS. 4 and 5 illustrate a detail on an enlarged scale of FIG. 3 in two different functioning positions; and FIGS. from 6 to 11 are each a schematic illustration of the mandrel of FIG. 1 in different sequential functioning steps.

The receiving seat 28 also delimits an annular valve seat 31, preferably with one or more frustoconical surfaces for the engagement by a valve means or element, typically a sphere 32, resiliently loaded by the spring 26 and movable between a closed or interception position, as shown in FIG. 4, and open positions (FIG. 5) to allow a work fluid to flow through it, i.e. to allow the work fluid to cross the piston 19, as will be explained in more detail below. Around the receiving seat 28 and at the piston 19 face opposite that engaged by the piston rod 21, an annular recess 33 is formed acting as receiving seat, as will be explained below.

In the axial through cavity 3 of the cylindrical shaft 2, a tubular element or rigid tube 34 is mounted which is supported by two rings or seals 41 and 42 and delimits a fluid sealed gap 37 with the cylindrical shaft 2 which is in communication with the outside of the cylindrical shaft 2 through a through opening or pair of through openings 38 formed in the wall of the shaft 2 and with the interior of the tube 34 through a passage or hole 40. The seal of the air space 37 is ensured by a pair of terminal seals 41 and 42.

At the end of the tube 34 turned towards the chamber 17, the tube 34 is in fluid communication with the chamber itself and has an inner enlargement 43 in its cavity, in which a hollow valve body 45 is housed and fixed, e. g. by means of screwing in at 44, a hollow body 45 preferably having a wider inner axial opening 46 than the inner opening of the tube 34, such that a shoulder is delimited at one end thereof abutting against the bottom of the enlargement 43. At its other end, the valve body has an inner narrowing which delimits a valve seat 47, against which a valve element 49 resiliently loaded by resilient loading means, preferably a calibrated helical spring 50 acting from the opposite side, e. g. against the shoulder 47, is designed to abut The valve element 48 is thus movable between a rest or closed position in which it is pushed by the spring 50 against its valve seat 49 and a work or open position in which it is moved away from its valve seat, as will be further explained below. The valve element 48 supports or is integral with a tappet means or element 51, preferably maintained axially guided (in any suitable manner) within a valve body 45 so as exiting from the valve body 45 and overhangingly to extend therefrom. The valve body 45 is embedded in the tube 34 so that to leave clear a terminal opening section 52 of the tube 34 with length substantially equal to the depth of the annular recess 33 formed in the piston 19, whereby the terminal section 52 of the tube 34 can removably penetrate within the annular recess 33.

As can be better seen in FIG. 5, when the terminal section 52 begins to insert itself in the annular recess 33 and as long as it engages such recess, a sealed chamber 35 is delimited between piston 19 and rigid tube 34 (and with the front of the valve body 45), through which, when the valve element 48 opens, or rather moves the valve element 32 backward by means of the tappet element 51, communication occurs between inner opening 46 of the tube 34 and work chamber 17. In the withdrawing step of the tube 34 from the piston 19, i.e. in the cutoff step of the pressurized fluid supply to the work chamber 17 or rather while the valve element 48 is moved away from the valve element 32, the chamber 35, which meanwhile increases its capacity owing to separation of the valve body 45 from the piston 19, remains at the same pressure as that present in the work chamber 17 until the valve element 32 is brought into closed position. This ensures that after the loading of the work chamber 17 with pressurized (air) fluid, the chamber 17 does not experience an abrupt drop of pressure in the closing step of the valve element 32, a phenomenon which would occur if the seal chamber 35 was not foreseen.

At its other end, the tube 34 is blind and extends outwardly from the shaft 2 in order to be engaged in any suitable manner with a linear actuator means, preferably formed by a piston or displacer element 53 rigid in movement with the tube 34 so that to cause it axially to slide, upon control, within the shaft 2. The displacer 53 is mounted sealedly sliding within the chamber 54 of a cylinder 55, e. g. overhangingly supported by a fixed collar 56 fixed on the shaft 2. Pressurized work fluid, e. g. pressurized air, can be supplied to the chamber 54 through input/output openings formed on the side opposite to the displacer 53, as will be explained below. The cylinder 55 and the displacer 53 form a double-acting fluid-operated piston and cylinder group or unit.

As is better illustrated in FIGS. 6 to 11, the input/output openings for the chamber 54 are indicated with 57 and 58 and are in communication with a fluid (air or liquid)-operated control system, generically indicated with 59, which comprises a pressurized fluid source, such as a compressor or a pump, of any suitable type and generically indicated with 60 in the drawings, valve means, e. g. composed of an electric distribution valve 61 in fluid communication with the source of pressurized work fluid 60 and having two outputs 62 and 63. The outlet 62 is connected with both the input/output 38 in the shaft 2 and with a valve group 64 in turn connected with the input/output 57 to the chamber 54. The valve group 64 is formed by a throttling member and by a check valve connected in parallel, the check valve being arranged to intercept the flow directed to the chamber 54. The output 63 is instead connected with a valve group 65 in turn connected with the input/output 58 to the chamber 54. The valve group 65 is formed by a throttling member and a check valve connected in parallel, with the check valve being designed to intercept the return flow from the chamber 54.

The electric valve 61 can be controlled by two control pedals 66 and 67 operable by the operator of the balancing machine, as shall be explained below.

The operation of the locking-unlocking device described above is as follows.

Figure 6:
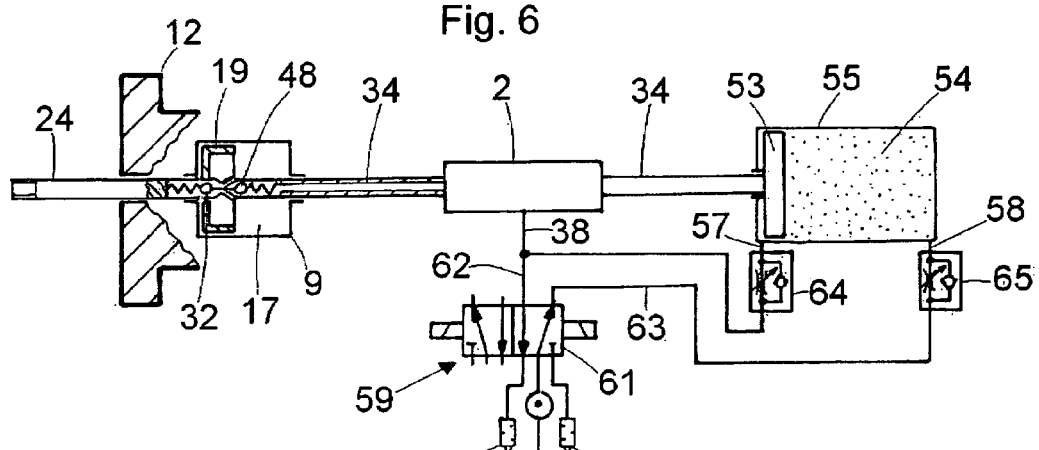
Figure 7:
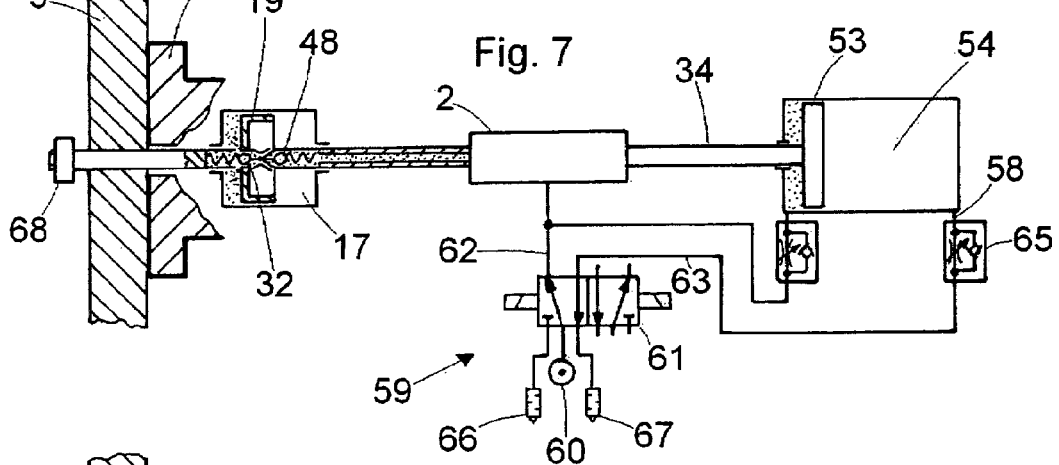
Figure 8:
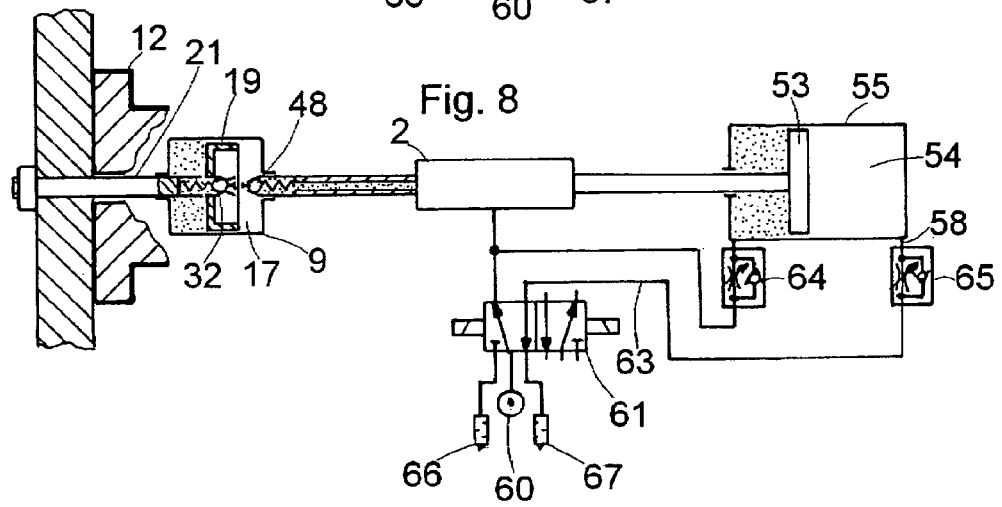

For the sake of illustration one can start from the discharge step or condition schematically shown in FIG. 6. The operator presses the control pedal 67 so that the electric valve 61 supplies the output/input 58 with pressurized air through the valve group 65, while the openings/closings 38 and 57 are now both in their open (unloading) position. The pressurized air, which thus enters into the chamber 54 from the displacer side 53 opposite that of the tube or piston rod 34, moves the displacer 53 in the direction to make the sliding tube 34 advance within the shaft 2 until it inserts, firstly, its other internally enlarged end 43 in the recess 33 of the piston 19 so to bring the two valve seats 49 and 31 into reciprocal abutment, and thus to bring the tappet element 51 against the valve element 32, which is forced to move backward against the force of the spring 26 and at the same time, by reaction, move the valve element 48 backward, which supports the tappet element 51 (FIGS. 5 and 7).

With this arrangement, the communication is opened between the inner opening of the tube 34, the axial opening 46 of the valve formed by the valve body 45 and by the valve element 48, the axial opening 25 of the piston rod 21 through the valve element 32, the lateral opening or openings 30, the opening 15 and the chamber 17, which can thus be supplied with pressurized air.

Meanwhile, the operator places a wheel 5 to be balanced onto the hub 24 and locks it in position against the bell-shaped member 12 by means of any suitable removable holding or fixing means, e. g. a ring 68 with external conical surface for centering the wheel rim 5 on the rotation axis of the mandrel and internally threaded for its screwing on the hub 24.

After placing the wheel 5 on the hub 24 in the above indicated manner, there is a waiting or stand-by state until the operator presses the control pedal 66. The actuation of the pedal 66 results in the valve 61 being commutated, which discharges the input/output 58 and supplies pressurized air to the input/output 38, and through the valve group 64 also to the input/output 57. The air supplied to the input/output 38 reaches the air space 37 between piston rod 2 and tube 34 and thus enters the inner opening of the tube 34 through the hole or holes 40, thereby placing the chamber 17 under pressure. At the same time, the air supplied through the input/output 57 pressurizes the chamber 54 on the side of the displacer 53 turned towards the tube 34 (pressurizing step of the locking/unlocking device).

The resistance to the air passage by the throttling member of the valve group 64 slows the stroke of the displacer 53 with respect to the piston, which ensures the maintenance of the abutment of the tube 34 against the piston 19 and hence that the two valve elements 32 and 48 keep free the supply passage of pressurized air directed to the chamber 17. With this arrangement continuing the supply of compressed air, the piston 19 will be displaced within the chamber 17 and thus the simultaneous driving of the piston rod 21 until the ring or other suitable locking means 68 forcibly abuts against the wheel rim 5, while air which is continually supplied through the input/output 57 will continue to make the displacer 53 pull back until it reaches the bottom of the chamber 54 or another suitable limit means. This will cause the separation of the tube 34 from the piston 19, with consequent closure of the pressurized air supply passage to the chamber 17, since the tappet element 51 is disengaged from the valve element 32 and the springs 50 and 26 bring their respective valve element 48 and 32 back into closed position (FIG. 8) and the chamber 17 remains under pressure (locking pressure) to maintain the wheel rim 5 well locked against the bell-shaped member 12. Since with valve elements 32 and 48 in open position in the supply path of pressurized air to the chamber 17 the same pressure level is established as that existing in the chamber 17, when the tube 34 is removed from the piston 19 any blow-by is prevented since in addition to the action of the spring 26 the valve element 32 is also subject to the counter-pressure of the chamber 17.

With the removal of the tube 34 from the piston 19 and the consequent closure of the valve elements 32 and 48, one also obtains the mechanical separation of the rotating equipment (bell-shaped member 12, piston 19, piston rod 21, hub 24, wheel 5 and fixing or locking means 68) from the non-rotating equipment (shaft 2, tube 34, cylinder 55 and displacer 53) of the mandrel. This permits avoiding interferences between the two rotating and fixed parts or equipments in the subsequent rotation step (controlled by the operator and schematically indicated with an arrow A in FIG. 9) of the rotating equipment or part and reading of the signals of imbalance. The operator can therefore proceed with carrying out the balancing of the wheel 5.

Once the balancing operation is terminated, the operator drives the pedal 67 to activate the electric valve 61, which opens the inputs/outputs 38 and 57, discharging them, while it begins supplying compressed air to the input/output 58 through the valve group (FIG. 10). With this structure of the pneumatic system 59, the displacer 53 is pushed to make the tube 34 advance towards the piston 19 until it moves the valve elements 32 and 48 into open position, thus discharging the chamber 17 of the pressurized air therein contained, which then follows a backwards path through the openings 30, the opening or light 25 of the piston rod 21, the inner light or opening of the tube 34, the openings 40, the air space 37 and the input/output valve 38 now discharged (FIG. 10).

While air is evacuated from the chamber 17, the piston 19 is thrust until it comes into abutment against the wall of the bell-shaped member 12, also driving the piston rod 21 backward with it and causing the backward movement of the locking ring 68, so that the wheel 5 can be withdrawn from the hub 24 (FIG. 11) and the work cycle can begin once again.

It will be noted how a device according to the present invention is formed by a movable part composed of the sleeve 9, bell-shaped member 12, piston 19, piston rod 21 and by the containment cylinder 24 designed to rotate at relatively high speed in the step of balancing a tired wheel D, and by a fixed part comprising the cylindrical shaft 2, the rigid tubular element 34 and the linear actuator, formed by the cylinder 54 and the displacer 53, and designed to move closer to the movable part in order to supply pressurized (air) fluid to the work chamber (17) and to move away from it to remain stopped (non-rotating) during the rotation of the movable part. Once the rotation of the movable part has terminated, the work chamber 17 is discharged in any suitable manner and the piston 19 is caused to return to its initial position, that at which the locking means 68 are removed from the flange 13, e. g. by means of one or more electrically operated valves, or preferably, as in the example illustrated in the drawings and described above, the fixed part once again approaches the movable part to carry out both the discharge of the work chamber 17 and the backward movement of the piston 19 through the operation of the linear operator 53, 55.

The locking-unlocking device described above is susceptible to modifications or variations within the scope of protection as defined by the claims.

Thus the fluid-operated control system 59 can comprise an electric-electronic portion arranged to drive a linear actuator, such as a rack, driven by a reversible electric motor designed to make the rigid tube 34 move.

The invention claimed is:

1. A locking device for a maintenance machine of a rotating body, having a fixed portion comprising a hollow fixed support element borne by the maintenance machine, and a control system, and a movable portion comprising a bell-shaped member with flange mounted for rotation coaxial to said hollow support element and designed to support said rotating body, and holding or locking means arranged to removably fix said rotating body against said flange of said bell-shaped member, driving means suitable for driving, upon control, said movable portion in rotation, the locking device further comprising:
- an axial piston rod member slidably mounted in an axial shank portion of said bell-shaped member and having one inner end secured to said piston element and its other end overhangingly extending in axial alignment with said bell-shaped member;
- valve means borne by said piston element and designed to control at least one fluid passage through it;
- a rigid tubular element slidingly mounted within said hollow fixed support element and having one end thereof in fluid communication with said work chamber and arranged to control said valve means of said piston element, and its other end blind, thereby delimiting an inner opening in fluid communication with said control system; and
- a linear actuator arranged to make said tubular element axially slide in said hollow support element upon control of said control system;

wherein
said movable portion comprises a sleeve element, which is operatively connected with said driving means, mounted for rotation on said fixed support element and has one of its ends extending overhanging beyond said fixed support and coaxially supporting at its head said bell-shaped member, thereby delimiting a work chamber with said bell-shaped member;
a piston element slidably mounted in said work chamber and designed to control said holding means,
and said fixed portion comprising pressurized fluid supply means suitable for loading, upon control of said control system, said work chamber with pressurized fluid, and for moving away from said movable portion before said movable portion is set in rotation by said driving means, and discharge means for discharging, upon control, said work chamber once the rotation of said movable part has terminated.

2. A device according to claim 1, wherein said pressurized fluid supply means is suitable for acting as a discharge means.

3. A device according to claim 1, wherein said valve means comprises a first valve seat formed in said piston element, a first valve element located movable in said valve seat between a closed position in which it intercepts the flow through said piston element and an open position, resilient loading means for said valve element; and tappet means supported by said rigid tubular element and arranged to move said valve element from its closed position.

4. A device according to claim 3, comprising a seal chamber between said piston element and said rigid tubular element, in which, in the supply step of pressurized fluid to said work chamber, the same pressure exists as that in said work chamber, thereby preventing pressure drops in it upon cutting off the pressurized fluid supply.

5. A device according to claim 3, wherein said valve means comprises a blind terminal cavity in said internal end of said piston rod member designed to house said valve element and said resilient loading means and having at least one lateral passage for placing said valve seat in communication with said work chamber.

6. A device according to claim 3, wherein said tappet means comprises a second valve seat located at the head of said end of said tubular element in fluid communication with said work chamber, a second valve element which supports said tappet means and is arranged within said valve seat and movable between a closed position in which it intercepts the fluid communication between said rigid tubular element and said work chamber and said tubular element is moved backward with respect to said piston element, and an open position, in which it engages, by means of said tappet means, said first valve element, and resilient loading means for said second valve element.

7. A device according to claim 3, wherein said piston element has a front annular recess for removably engaging with said end of said tubular element in fluid communication with said work chamber.

8. A device according to claim 1, wherein said end extending from said bell-shaped member of said axial piston rod member comprises a slide guide portion slidably mounted within a containment cylinder fixed in axial alignment with said axial shank portion of said bell-shaped member.

9. A device according to claim 8, wherein said control system comprises a pressurized fluid source, valve means controllable by an operator and in fluid communication with said pressurized fluid source and having a first output in fluid communication with said rigid tubular element and with an input-output of said linear actuator means through a valve group formed by a throttling member and a check valve connected in parallel, the check valve being arranged to intercept the fluid directed to said actuator means, and a second output in fluid communication with the other input-output of said linear actuator means through a valve group formed by a throttling member and a check valve connected in parallel, the check valve being designed to intercept the discharge flow from said actuator means.

10. A device according to claim 1, wherein said linear actuator means comprises a fluid-operated cylinder and piston equipped with inputs/outputs for fluid communication with said control system.

11. A device according to claim 1, wherein said rigid tubular element delimits a fluid seal air space with said hollow fixed support element, which is in fluid communication with the cavity of said rigid tubular element, through at least one passage formed in said rigid tubular element, and with said control system by means of at least one through opening.

* * * * *